United States Patent [19]

Picklesimer

[11] Patent Number: 5,197,062
[45] Date of Patent: Mar. 23, 1993

[54] METHOD AND SYSTEM FOR SIMULTANEOUS ANALYSIS OF MULTIPLEXED CHANNELS

[76] Inventor: David D. Picklesimer, 78 Annin Rd., West Caldwell, N.J. 07006

[21] Appl. No.: 755,037

[22] Filed: Sep. 4, 1991

[51] Int. Cl.[5] .............................................. H04J 3/14
[52] U.S. Cl. ........................................ 370/13; 370/15; 370/17; 371/20.4; 371/20.5
[58] Field of Search ................ 370/13, 15, 17; 379/1, 379/5; 371/20.4, 20.5

[56] References Cited

U.S. PATENT DOCUMENTS

| | | | |
|---|---|---|---|
| 3,308,434 | 3/1967 | Glasson et al. | 340/167 |
| 3,315,228 | 4/1967 | Futerfas et al. | 340/146.1 |
| 3,562,710 | 2/1971 | Halleck | 340/146.1 |
| 3,596,245 | 7/1971 | Finnie et al. | 340/146.1 |
| 3,725,860 | 4/1973 | Kemper et al. | 340/146.1 X |
| 3,760,354 | 9/1973 | Ginn | 340/146.1 E |
| 3,824,548 | 7/1974 | Sullivan et al. | 340/146.1 E |
| 3,914,740 | 10/1975 | Han | 340/146.1 E |
| 4,428,076 | 1/1984 | Schuon | 371/5 |
| 4,742,518 | 5/1988 | Shedd | 371/22 |
| 4,903,323 | 2/1990 | Hendershot | 379/1 X |
| 4,949,355 | 8/1990 | Dyke et al. | 370/13 X |

Primary Examiner—Douglas W. Olms
Assistant Examiner—Russell W. Blum

[57] ABSTRACT

A method and system for test data generation, reception, synchronization and analysis of multiple channels within a multiplexed data stream is described herein. Latches on the parallel inputs and outputs of the test data generation shift registers shuffle shift register values for individual channels in and out of memory at the appropriate time in the time division multiplexed (TDM) data stream. State machine control circuitry is used to generate the complex control signals. State machine control memory is a dual port memory, allowing the control signals to be modified as testing requirements vary. This allows various types of analyses for different channels within the TDM data stream simultaneously. A generator dual port memory allows analysis of different types of test data in each channel within the TDM data stream. Results are acumulated in the results dual port memeory and are accessed by a microprocessor for further processing and display.

36 Claims, 5 Drawing Sheets

METHOD AND SYSTEM FOR SIMULTANEOUS ANALYSIS OF MULTIPLEXED CHANNELS

FIELD OF THE INVENTION

This invention relates to the generation of multiple, independent test data and analysis of these test data as these test data are received at another point. The generator output and analyzer input are typically time division multiplexed (TMD) data at two points within the network. The present invention may also be implemented by allowing TDM multiplexers or channel banks to be tested before being installed. The present invention is also capable of functioning in digital speech interpolation (DSI) systems.

BACKGROUND OF THE INVENTION

Telecommunications requirements have evolved tremendously since multiplexed T1 was first installed in the early 1960s. T1 was originally developed to carry 24 digitized voice channels in a time division multiplexed (TDM) format. With the evolution of computers and the resulting data communication requirements, Digital Data Service (DDS) circuits were offered directly to customers beginning in the early 1970s. One or more DDS circuit would reside in one of the 24 channels within a T1.

Conventionally a T1 circuit carries subrate DDS traffic at rates as low as 1200 bits/second. Carrying subrate traffic is accomplished by first multiplexing the subrate traffic with or without other subrate channels to the DS0 rate of 56 kbit/second. These DS0s are then multiplexed to the T1 rate.

With the proliferation of computers and the corresponding data communications requirements since the 1980s, multiple channels within a T1 (referred to as N-by-56 kbit/second service) and even entire T1s are now offered directly to customers. As a result, the ability to send technicians into the field to test every problem has become a substantial problem.

Carriers have begun installing automated cross-connect switches in order to allow quick re-routing of circuits as demand increases or failures occur. A side benefit of these switches is that they offer T1 test ports which provide up to 24 channels which can be tested at one time. Typically, more than 500 T1s, each containing up to 24 channels are switched by these cross-connects. Any of these channels can be rounted to one of typically 10 to 30 T1 test ports. In order to test channels rounted to these T1 test ports, the T1 signal at the T1 test ports must be demultiplexed into individual channels and then test equipment must be provided for each channel. This results in an enormous requirement for test equipment, as well as for power and floor space since test equipment for each channel must be duplicated for each test which is to run simultaneously.

DS3 and higher rate multiplexing schemes are currently used operating at data rates of 44 Mbit/s and higher. These multiplexing schemes are all based on the T1 multiplexing level. A DS3 circuit conventually carries DS0 traffic. These DS0s would have been multiplexed to T1 then DS2 and finally to the DS3 rate.

In Europe the CCITT hierarchy uses multiplexing rates based on a 2048 kbit/s standard. Again, these 2048 kbit/s signals are multiplexed to data rates of 34 Mbit/s and higher.

Voice frequency (VF) encoding techniques have improved to the point that a standard eight bit channel within a T1 signal capable of actually support two VF communications paths. The equipment is being installed to carry VF using only four bits divides the T1 TDM format into what is in effect 48 channels. This results in twice the traditional number of voice connections being carried in the same T1 bandwidth.

With the increased need for data communications, conventional multiplexers are being installed not only in the network, but within the customer premises as well. As a result, there is a large demand for testing multiplexers by manufacturer and installers. Conventionally this would be done by "multiplexing-up" test data transmitted into one or more low speed channels to the higher TDM rate. The TDM output would then analyze one channel at a time by dropping the channel out of the multiplexed TDM data path. These test are time consuming when the number of channels to be tested is large.

In some applications the bandwidth available in a communications link is so limited that digital speech interpolation (DSI) is used so that bandwidth available during pauses in speech bursts can be allocated to another speaker. The time division allocation of this technique changes so rapidly that testing is typically not performed on the link between the DSI units.

The information discussed above is hereby incorporated by reference.

SUMMARY OF THE INVENTION

1. Object of the Invention

It is an object of this invention to provide a method and system capable of simultaneously generating independent test data for multiple channels within a TDM data stream.

It is a further object of this invention to provide a method and system capable of synchronizing and processing the test data within the channels of a TDM data stream independently to yield analysis results.

It is another object of this invention to provide a method and system operating at any multiplexed data rate and with any type of TDM scheme.

It is a further object of this invention to be capable of operating over multiple levels of multiplexing such as generating and analyzing test data at a DSO rate within a a DS3 multiplexing structure. The number of simultaneous tests is determined by the amount of memory available and the highest clock rate generated.

It is another object of this invention to provide a method and system capable of operating with any TDM multiplexing technique at any rate, including North American as well as European multiplexing techniques and rates.

It is another object of this invention to provide a method and system capable of generating and analyzing test data for any multiplexing technique including T1 providing both 24 and 48 channels.

It is another object of this invention to provide a method and system allowing for the simultaneous and independent testing of all channels transmitted through a multiplexer in either direction.

It is another object of this invention to provide a method and system capable of tracking channels which are moving within TDM data such that testing may occur on one or more channels between DSI units.

2. Brief Description of the Invention

The present invention generates independent test data for each channel to be tested within the multiplexed data stream and transmits the generated independent test data through the media to be tested. The present invention then analyzes the recovered test data, channel by channel, after the test data is transmitted through the media. For the application of the present invention, possible media are communications channels, wires, cables, fibers, telephone network, packet switched network, local loop, transmission equipment such as multiplexers, channel banks, repeaters, regenerators demultiplexers, modems, cross-connect switches, packet switches, central office switches, DSUs, CSUs, DSU/CSUs, DSI equipment, routers, matrix switches, and test access switches. The present invention is applicable to many types of test data generation and analysis such as pseudorandom bit patterns, fixed bit patterns, programmable bit patterns, programmable messages, alternating patterns, and encoded test tones.

One embodiment of the present invention includes a method of producing generated time division multiplexed (TDM) test data independently for multiple channels simultaneously, comprising the steps of:

generating a time division multiplexed (TDM) bit rate clock;

generating a position address corresponding to each bit in said generated TDM test data, based on said clock;

generating control signals based on said position address;

generating a shuffle address based on said control signals to address contents of a test data generator, said contents being stored and recalled for said channels;

swapping said contents for a channel, as said position address for said channel changes to position address for next channel, with previous test data generator contents for said next channel based on said shuffle address and said control signals;

generating TDM test data by operating said test data generator based on said clock and said control signals while repeatedly shuffling contents for last channel out and contents for current channel into said test data generator;

whereby a continuous bit stream containing discrete and independent TDM channels of generated test data is produced.

Another embodiment of the present invention includes a method of testing time division multiplexed (TDM) test data independently for multiple channels simultaneously, comprising the steps of:

recovering a TDM bit rate clock and recovered test data from a TDM input signal;

recovering TDM structuring information contained within said recovered test data for synchronization of a position address to said TDM structuring; synchronization of a position address to said TDM structuring;

generating said position address corresponding to each bit in said recovered test data, based on said clock;

generating control signals based on said position address;

generating a shuffle address based on said control signals to address contents of a reference generator and a results accumulator, said contents being stored and recalled for said channels;

swapping said contents for a channel, as said position address for said channel changes to position address for next channel, with previous reference generator and results for said next channel based on said shuffle address and said control signals;

generating TDM reference data by operating said reference generator based on said clock and said control signals while repeatedly shuffling contents for last channel out and contents for current channel into said reference generator;

analyzing said recovered test data based on said contents of said reference generator for a channel in order to derive results;

accumulating said results by operating said results accumulator based on said clock and said control signals while repeatedly shuffling contents for last channel out of said accumulator and contents for current channel into said accumulator;

whereby TDM channels within the recovered test data are simultaneously analyzed independently.

An additional embodiment of the present invention includes a system for producing generated time division multiplexed (TDM) test data independently for multiple channels simultaneously having:

1) means for producing generated test data which, when controlled by a means for generating state machine control signals, produces said generated TDM test data as an output;

2) means for generating a position address corresponding to each bit in said generated TDM test data;

3) means for storing contents of said means for producing generated test data for each of said channels and later recalling said contents, connected to said means for producing generated test data;

4) means for generating a shuffle address based on said position address, connected to said means for storing for addressing said means for storing;

5) means for generating state machine control signals addressed by said position address for: controlling said means for generating a shuffle address, controlling said means for generating a position address and controlling transferring of contents of said means for producing generated test data between said means for storing and said means for producing generated test data, said means for generating state machine control connected to said means for generating a position address, said means for generating a shuffle address, said means for storing and said means for producing generated test data;

6) means for generating a TDM bit rate clock connected to said means for generating a position address, said means for producing generated test data and said shuffle address generating means.

A further embodiment of the present invention includes a system for synchronizing to and testing time division multiplexed (TDM) test data independently for multiple channels simultaneously having:

1) means for recovering a TDM bit rate clock and recovered test data from a TDM input signal to be tested;

2) means for recovering TDM structuring information from said recovered test data for synchronizing a position address to said recovered test data, connected to said means for recovering clock and data;

3) means for generating a position address synchronized to said TDM structuring information which corresponds to each bit in said recovered test data, connected to said means for recovering clock and data, and said means for recovering TDM structuring;

4) means for generating state machine control signals addressed by said position address for: controlling said means for generating a position address, controlling a means for generating a shuffle address, controlling transfer of contents of a means for producing reference data between a means for storing said contents of said means for producing reference data and said means for producing reference data, controlling transfer of contents of a means for accumulating results between a means for storing said contents of a means for accumulating results and said means for accumulating results, said means for generating state machine control connected to said means for generating a position address, said means for generating a shuffle address, said means for storing said contents of said means for producing reference data, said means for storing said contents of said means for accumulating results, said means for accumulating results, and, said means for producing reference data;

5) means for producing said reference data which, when controlled by said means for generating state machine control signals, produces said reference data, connected to said means for recovering clock and data;

6) means for analyzing said recovered test data by comparison to said reference data, said results from said analyzing being sent to said means for accumulating results, said means for analyzing being connected to said means for recovering clock and data, said means for producing reference data, and said means for accumulating results;

7) means for accumulating said results connected to said means for recovering clock and data;

8) means for storing contents of said means for producing reference data for each of said channels and later recalling said contents, connected to said means for producing reference data;

9) means for storing contents of said means for accumulating results for each of said channels and later recalling said contents, connected to said means for accumulating results;

10) means for generating a shuffle address based on said position address, connected to said means for recovering clock and data, said means for storing contents of said producing reference data and said means for storing contents of said means for accumulating results for addressing said means for storing contents of said means for producing reference data and said means for storing contents of said means for accumulating results.

DETAILED DESCRIPTION OF THE INVENTION

Figure 1:
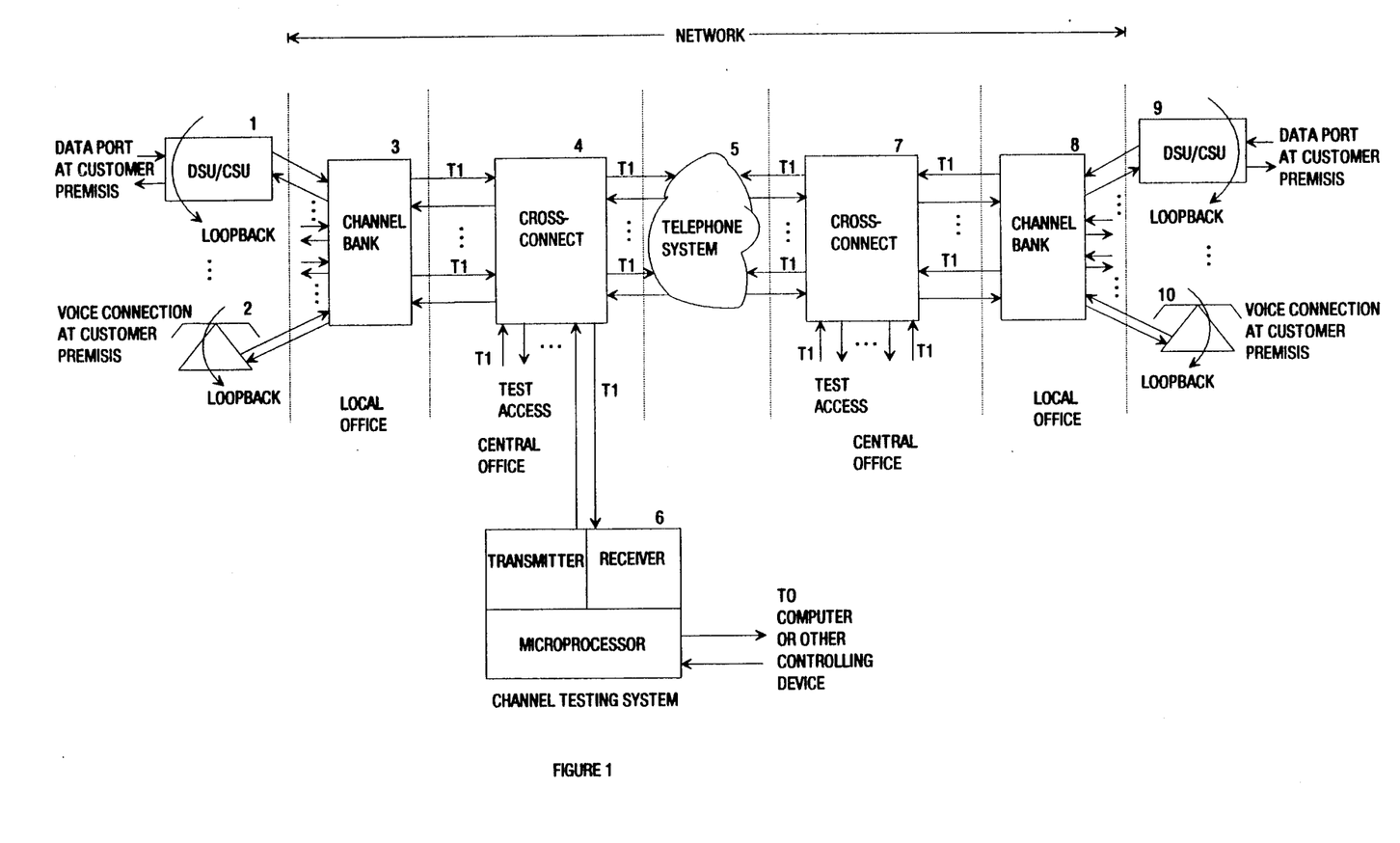
FIG. 1 presents a sketch of a conventional digital network with test access provided at a cross-connect.

FIG. 1 shows how customer data is connected or routed from one location to another in a conventional digital network. In FIG. 1, DSU/CSUs 1 and 9 terminate DDS services at the customer premises providing digital connections at rates of 1.2 kbit/s to 56 kbit/s. Telephone devices 2 and 10 interface with voice frequency (VF) interfaces at a customer premises where normal speech or modem data may be transported. These low speed customer premises connections or channels are combined in a time division multiplexed (TDM) manner into the standard T1 format by a channel bank. Twenty-four channels are conventionally TDM into T1 signal. T1 is the basic format used for switching and transport throughout the network. For the purpose of this description, the network is any communication equipment, including wires, cables, fiber and multiplexing, switching and transmitting equipment configured to provide connections, routes or circuits between two points or looped back to the same point which is conventionally located beyond the customer premises.

The T1 signal from channel bank 3 connects to cross-connect 4 which routes channels between the destinations. Cross-connects conventionally provide test access T1 interfaces for analyzing the performance of connections in the network. Any transmitting or receiving channel may be routed to one of the T1 test access interfaces. Test equipment is connected to test the channels of interest.

Testing is typically performed by first placing a channel in loopback (i.e. sending data received back toward the transmitting device) at either DSU/CSU 1 or 9, VF connection 2 or 10, channel bank 3 or 8. Next, test data is transmitted to the device in loopback. Such test data may include pseudorandom bit sequences or patterns modified and permutated patterns such as QRSS, fixed patterns, programmable patterns several bits long, a sequence of bytes simulating a protocol, alternating patterns, digitally encoded test tones, etc. The device in loopback transmits the test data back through the network to cross-connect 4 test access where the data is analyzed by channel testing system 6. The results from this analysis indicate the quality in terms of digital error measurements or VF measurements of the connection in which the test data was routed through the network.

An example is where the first test was performed between cross-connect 4 and DSU/CSU 1. Once test results are collected for the first test, the next test may be performed by reconfiguring the test access interface of cross-connect 4 to provide a connection to DSU/CSU 9. Once test results are collected from this second test, the entire circuit between DSU/CSU 1 and 9 will have been tested.

The present invention is also capable of being employed for end to end testing where the transmitting route is tested separately from the receiving route between two points in the network. An example is where conventionally portable test equipment is placed at the customer premises at either DSU/CSU 1 or 2, or at VF interface 9, or 10. Channel testing system 6 can then transmit to and receive from one of these devices when the route is configured through cross-connect 4 to the test access port. If, for instance, the path between DSU/CSU 1 and the channel testing system 6 is to be tested, the portable test equipment located at DSU/CSU 1 generates test data which DSU/CSU 1 transmits through the network to channel testing system 6 for analysis. Alternatively, for testing the connection from channel testing system 6 to DSU/CSU 1, channel testing system 6 generates and transmits test data through the network to DSU/CSU 1 where the test data is analyzed by the portable test equipment connected there.

Channel testing system 6 may be quite extensive. The present invention is a test data generator and test data analyzer which, when coupled with a microprocessor, is capable of providing a standalone channel testing system, and is capable of be used in conjunction with other test equipment as well.

The channel testing system application discussed throughout and shown in FIG. 1 is only one of a number of possible applications for the present invention. The inventor believes the present invention may be applied to other applications including: channel bank testing systems, multiplexer testing systems, testing of T1 circuits with proprietary framing formats, and testing of channels within DS3 and other framing formats.

Figure 2:
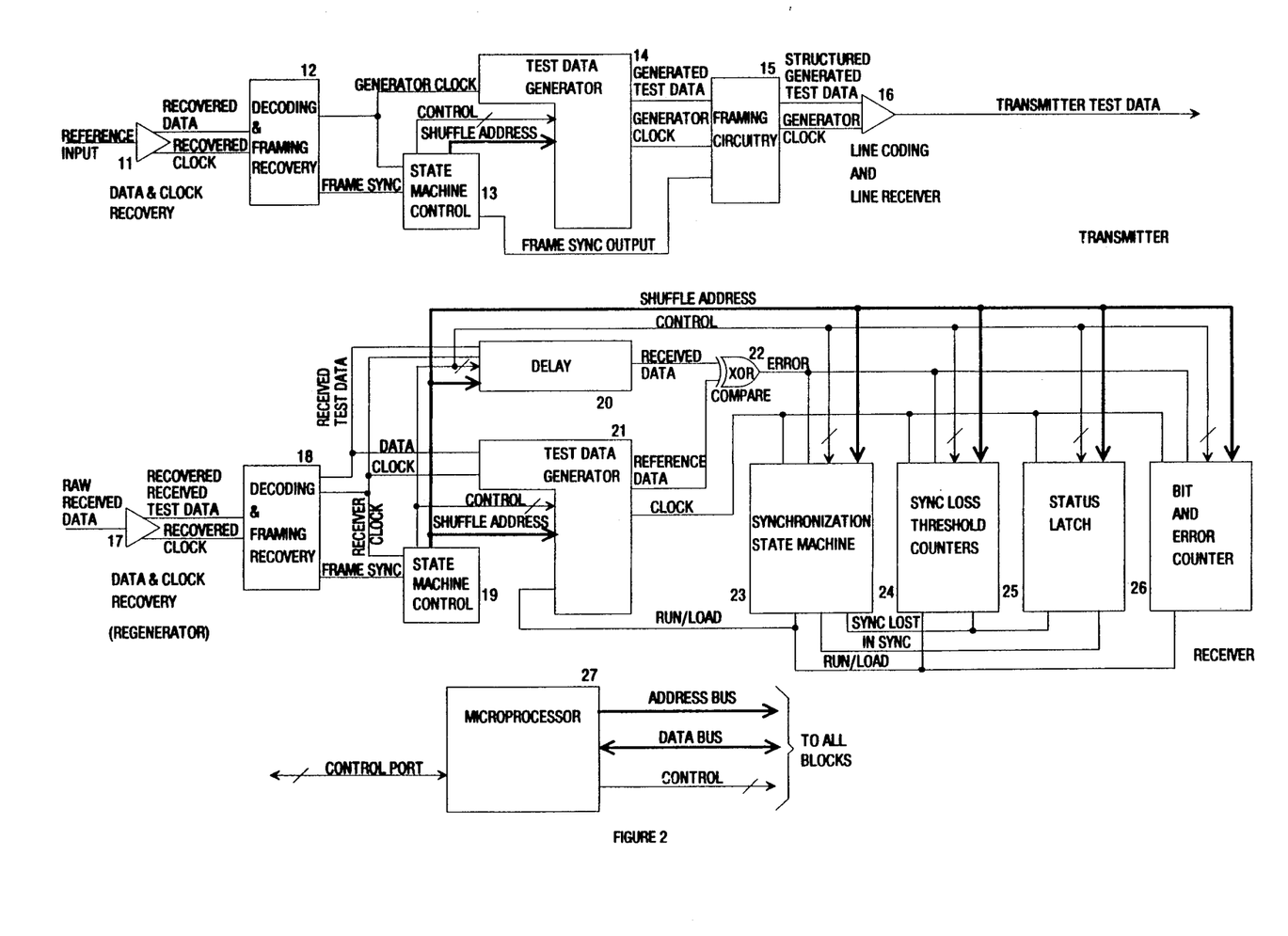
FIG. 2 presents a block diagram of an example of the present invention.

FIG. 2 is a block diagram of the present invention as it would conventionally be implemented in channel testing system 6 shown in FIG. 1. In FIG. 2 the transmitter section is described first, followed by the receiver section description.

Although the transmitter section is capable of generating test data based on an internal clock generator or oscillator, test data must conventionally be transmitted based upon the reference clock used by the network. The ability to operate based on the network reference clock is provided in FIG. 2 by connecting a reference T1 signal to data and clock recovery circuit 11. Network clock recovered from the data and clock recovery circuit 7 in the receiver section and a clock provided by a separate reference clock source from the network are also suitable clock sources for the transmitter section.

Recovered data and clock from data and clock recovery circuitry 11 connect to decoding and framing recovery circuitry 12. Circuit 12 may be applied in an application where test data are to be inserted into T1 circuits along with live traffic (referred to as through data mode because channels in which test data are not required are allowed to pass through the transmitter section without modification). Where through data mode is not required, decoding and framing recovery 12 is not used and recovered clock is connected directly to test data generator 14 and state machine control 13.

The decoding and framing recovery circuitry 12 performs two functions. Decoding in applications where the present invention may be applied refers to removing any line coding which may be present on the input signal. Typically the line coding for T1 is includes B8ZS or AMI. Examples of other types of line coding are B3ZS, B6ZS, HDB3, CMI, Manchester, ZBTSI, RZ and NRZ.

For applications where the present invention may be applied framing is a type of structuring applied to TDM data so that channels may be identified easily. There are a number of other reasons structuring may be applied including in-band error checking, passing status and alarm information, transmitting a supervisory protocol and passing signaling information. Structuring refers to any type of formatting applied to channels including D1, D1D, D2, D3, D4, D5, ESF, SLC, SLC-96, FAS, MFAS, FAS-CRC, MFAS-CRC, CMI, T1, T1C, T2, T3, T4, DS1C, DS2, DS3, DS4, DDS, DDS-2, ISDN primary, ISDN basic framing techniques, sequencing techniques (i.e. arbitrary ordering of TDM channels), and in-band protocol techniques such as used in digital speech interpolation DSI systems and proprietary multiplexing systems. It is possible for line coding and framing to be integral. When line coding and framing are integral, decoding and framing recovery occur as one step.

Recovered clock and frame sync from decoding and framing recovery circuitry 12 connect to state machine control 13. State machine control 13 generates a position address corresponding to each bit within the T1 frame. The most significant bits (MSBs) of the position address identify the framing bit as well as the 24 channels contained in the T1 frame and is called the channel address. The least significant bits (LSBs) of the position address correspond to each clock position consecutively numbered after the channel address changes and is called the state address. Thus, the channel and state addresses are subsets of the position address. The position address is synchronized to the recovered data by the frame sync signal from decoding and framing recovery circuitry 12.

In the T1 example described herein, eight state addresses are provided for each channel address, with the exception of the channel address corresponding to the framing bit location. Additional state addresses for each channel may be generated by multiplying the clock to a higher frequency using a phase locked loop oscillator or other suitable means. An examples are where multiplying the clock by two yields sixteen state addresses, by three yields 24 state addresses, and so forth.

An application for multiplying the clock to generate additional addresses is in generating or analyzing subrate data. In the present example, several TDM bit rate clock cycles are needed to shuffle register states in and out of memory for each channel. Subrates sometimes only occupy one or two bits in a channel. If several subrate connections are packed into a single eight-bit channel and test data must be generated and analyzed for each, the clock must be multiplied in order to generate enough states.

In the application of generating and analyzing T1 channels where the channel testing system interfaces at the DS3 (44 Mbit/s) rate, clock multiplication is not necessary even though multiple multiplexing levels are involved. Multiplication is not necessary because the T1 channels still have an eight-bit structure allowing eight state addresses for each channel, even though the recovered clock is much faster.

There are T1 applications where TDM structuring techniques are used to generate forty-eight four bit channels. In a case such as the one just described, there would be 49 channel addresses and only four state addresses for each channel address (other than the channel address which corresponds to a framing bit) if no clock multiplication is implemented as was previously described.

State machine control 13 generates control signals based on the position address to generate two other addresses. These addresses are the previous position address and the next position address and are discussed in detail later in this description. Previous position address and next position address are multiplexed together by state machine control 13 to produce the shuffle address used by the test data generator.

State machine control 13 generates a number of control signals or gates based on the position address which are used to control the transmitter in general, but in particular, to control the test data generator. A frame sync output signal is also provided to framing circuitry 15.

Test data generator 14 independently produces several types of test data simultaneously for each channel address. The generator is also capable of producing test data for multiple channels which are operating as a single, higher speed channel. An example is for T1 where combining two or more low speed channels into a single higher speed channel is referred to as N×64 kbit/s or N×56 kbit/s service. The generated test data is connected to framing circuitry 15 by the generated TDM test data signal. Generator clock is also passed to framing circuitry 15 from the test data generator.

Framing circuitry 15 appends structuring information, including any framing which may be required by the media to the generated TDM test data. The frame sync output from state machine control 13 causes structuring to be multiplexed into the generated TDM test data at the correct bit locations. Structured generated test data is the output from the framing circuitry and connects to line coding and line driver 16.

Framing circuitry 15 is optional but framing is conventionally required to provide structured test data. There are other methods of implementing the structuring which include accessing structuring directly with the position address (or address related to the position address) out of a memory within test data generator 14, generating structuring separately and then multiplexing structuring and generated test data together, passing the structuring information through from the data and clock recovery circuitry 11 when through data operation is used, accessing structuring information directly with the position address out of a memory separate from test data generator 14, and any combination of these methods.

Once the generated test data is structured, line coding and driving circuitry 16 transmit the structured generated test data onto the media. Clock and structured generated test data are routed to the line coding and driving circuitry, in the example of FIG. 2, from the framing circuitry 15, but as previously discussed, the connection to the clock and structured generated test data is capable of being made in a number of places.

Data received from the media for analysis by the receiver section is called raw received data and are regenerated by data and clock recovery circuitry 17 producing recovered test data and recovered clock output signals. Possible differences between data and clock recovery circuitry 11 and 17 are receiver sensitivity, recovered clock stability, and pulse shape quality sensitivity. Some kind of structuring is required for the recovered test data to facilitate synchronization of the position counter to the TDM structure, unless the recovered test data is a single unstructured, unmultiplexed data stream. If recovered test data is unstructured and unmultiplexed, the recovered test data will be analyzed as if it were one channel. Structuring is assumed for the examples of FIGS. 1-5.

Decoding and framing recovery 18 performs the same function as previously described in the transmitter section above for decoding and framing recovery 12. In the case of the receiver section however, outputs of decoding and framing recovery 12 recovered test data and receiver clock connect to delay 20 and test data generator 21, with receiver clock and frame sync signals going to state machine control 19 as well. Receiver clock may be multiplied as needed to generate additional state addresses as was previously described for the transmitter section.

State machine control 19 works identically to transmitter section block 13 previously described, with the modification that additional control outputs are provided to control additional functions of the receiver section.

Test data generator 21 works identically to test data generator 14 used by the transmitter section, with the exception that test data generator 21 must synchronize to the incoming test data for analysis of pseudorandom bit sequences or patterns, fixed patterns, programmable patterns, sequences of bytes simulating a protocol, alternating patterns, digitally encoded test tones, etc., and in a different way, for analysis of digitally encoded VF test data. The discussion of FIGS. 1-5 will focus on the analysis digital test data and not on encoded VF test data, although some of the concepts may apply to both types of test data.

Synchronization state machine 23 (described more fully in the discussion for FIG. 5) provides a run/load signal to test data generator 21. When the run/load signal indicates a load operation, the test data generator shifts in recovered test data from decoding and framing recovery 18. When the run/load signal indicates a run operation, the test data generator performs normally, generating test data as was described for test data generator 19 in the transmitter section. The test data output of test data generator 21 is called reference data, since reference data is what the recovered test data will be compared to by comparator 22 when determining whether errors occurred on the route through the network. Test data generator 21 conventionally provides receiver clock to other circuitry in the receiver, but clock may be provided from other points in the receiver section as previously described for the transmitter section.

The recovered test data is delayed by delay circuitry 20 in order to align the recovered test data bit by bit with the synchronized reference data. While it is possible to compare sooner and avoid the delay, the timing requires the delay to ensure that no errors are missed during transition from out of sync to in sync conditions. The inventor believes it may be possible to make the comparison sooner and eliminate the need for delay circuitry 20 in some applications.

Synchronization state machine 23 determines when synchronization to the recovered test data has been achieved for each channel based on the error signal from comparator 22. Synchronization state machine 23 controls loading of test data generator 21, verifies that test data generator 21 is synchronized to the recovered test data, provides synchronization status information to status latch 25, and controls the operation of sync loss threshold counters 24 and bit and error counters 26.

Sync loss threshold counters 24 are only allowed to signal a synchronization loss if the recovered test data and reference data were previously in synchronization. Sync loss threshold counters 24 analyze the distribution and frequency of errors to determine when synchronization is h no longer present. When sync loss threshold counters 24 determine that resynchronization is necessary, the sync-lost signal toggles to signal status latch 25 that a sync-loss has occurred and to signal synchronization state machine 23 to cause test data generator 21 to begin searching for synchronization again.

Status latch 25 maintains status changes such as synchronization gained and synchronization lost as well as storing the current state of synchronization (i.e. in-sync or in sync-loss). The results previously discussed are accumulated and stored in memory in such a way that the microprocessor can access the results for further processing or display.

Bit and error counter 26 stores the number of bits over which errors have been counted as well as the number of errors that have occurred. These are results which are stored in memory in such a way that the microprocessor can access the results for further processing or display. Bit and error counters 26 are synchronized by the run/load signal from synchronization state machine 23.

Figure 5:
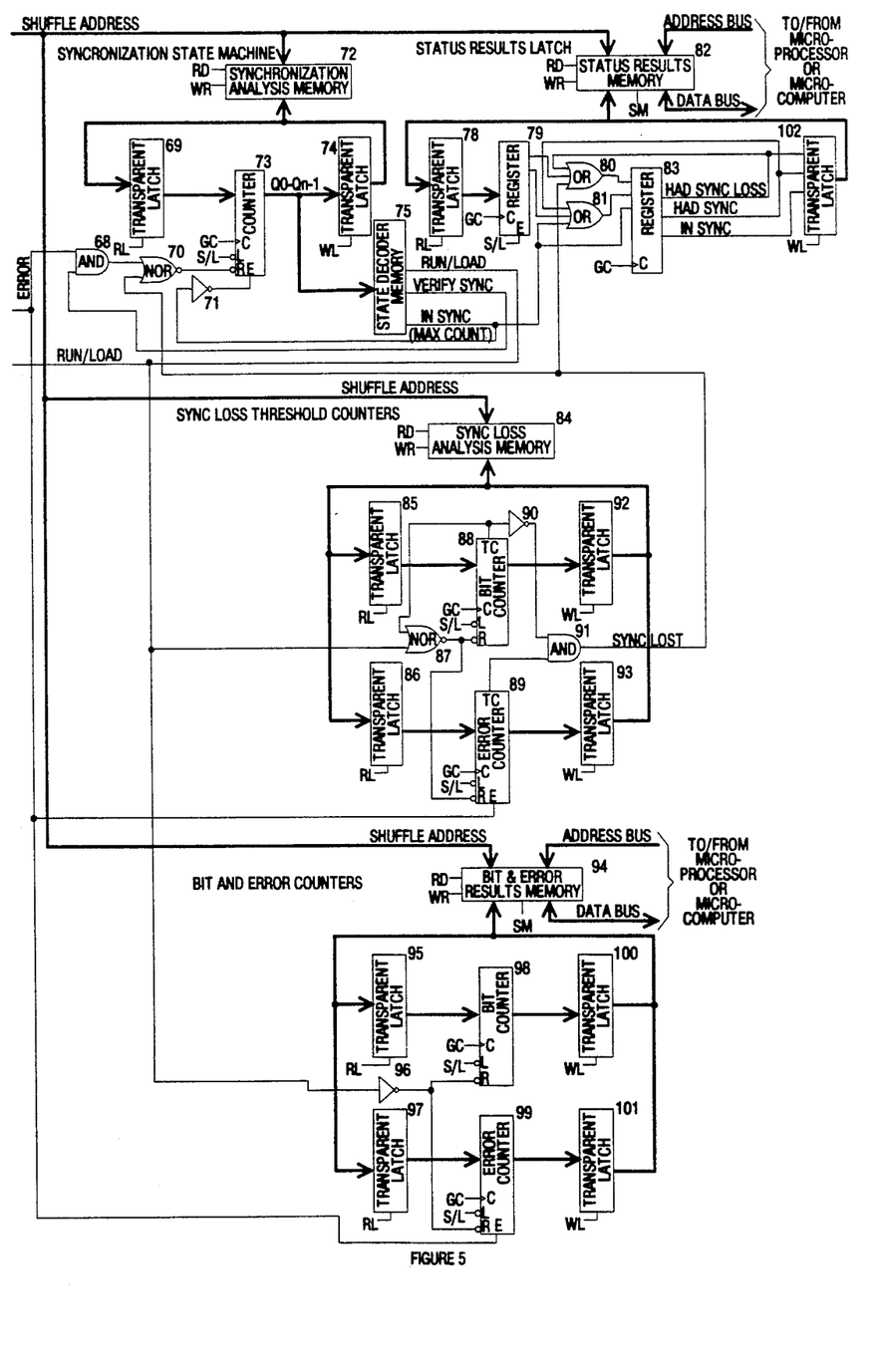
FIG. 5 presents a detailed block diagram of the test data analysis circuitry of the present invention.

Not shown in FIGS. 2 or 5, an additional analysis capability of the present invention which is a direct extension of the bit and error counters described above would be to add a block error counter which would count only blocks of bits which were not error free. The block size is capable of being variable, asynchronous (i.e. free-running) or synchronous to errors (the block size beginning with the occurrence of an error).

Figure 4:
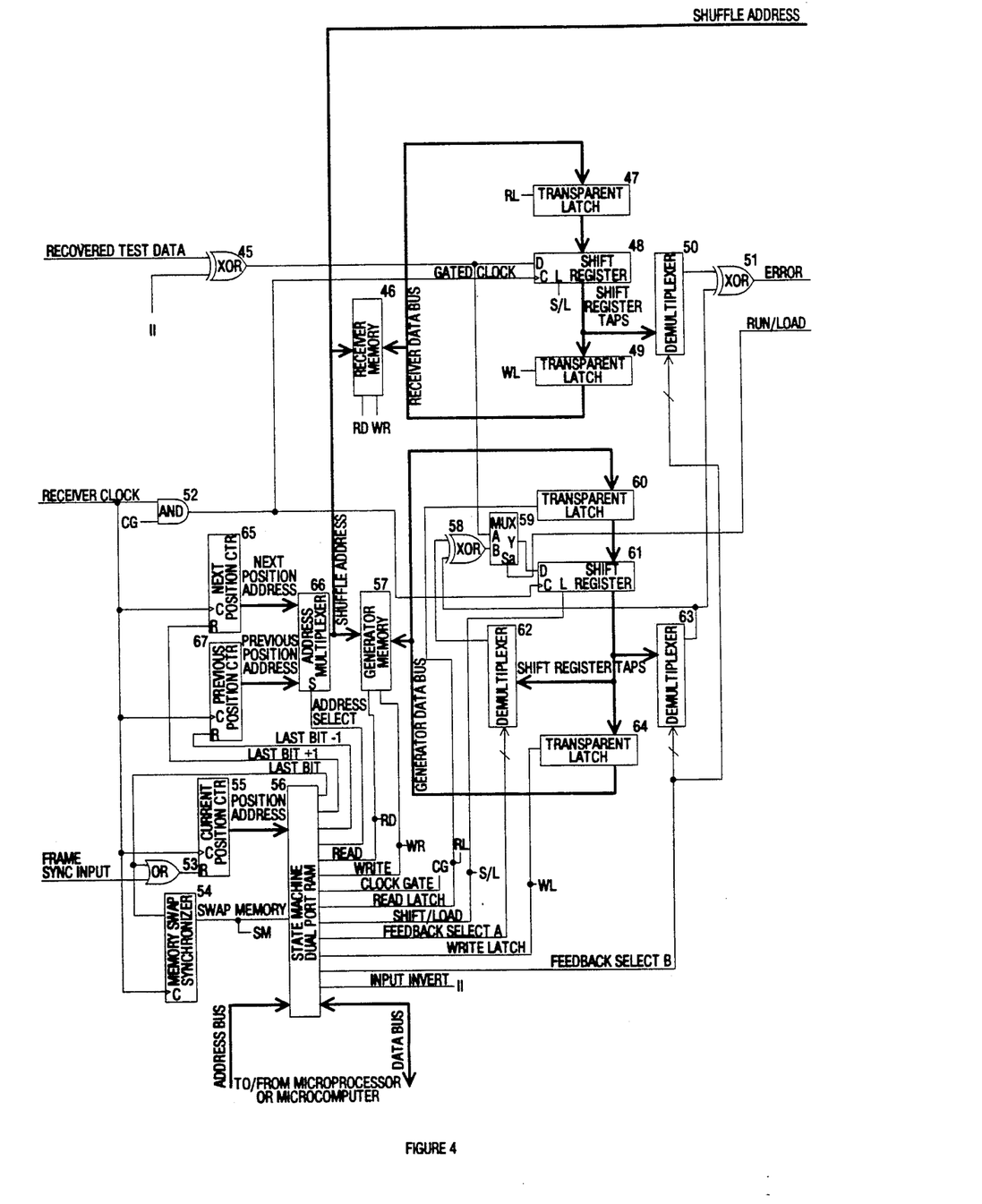
FIG. 4 presents a detailed block of the test data receiver circuitry of the present invention.

Not shown in FIGS. 2 or 4, additional analysis capabilities of the present invention which is a direct extension of test data generator 21 and delay 20 is the ability to analyze recovered test data by comparing a channel at a time instead of bit by bit to generate results such as VF frequency, peak code, and VF level.

The microprocessor connects to all blocks in FIG. 2 in order to collect status information, collect results, configure test data generators 14 and 21, configure state machine controls 13 and 19, program sync loss thresholds, and control framing circuitry 15 and line coding and line driver 16.

The microprocessor interfaces to the outside world through a control port. The inventor believes that results may be sent out from and control information into the control port by way of a number of devices including: a dumb terminal, a personal computer, an IEEE-488 interface, a modem, a serial port, controlled through a channel in the network, a computer system, and networked together with other microprocessors to a master network server.

Figure 3:
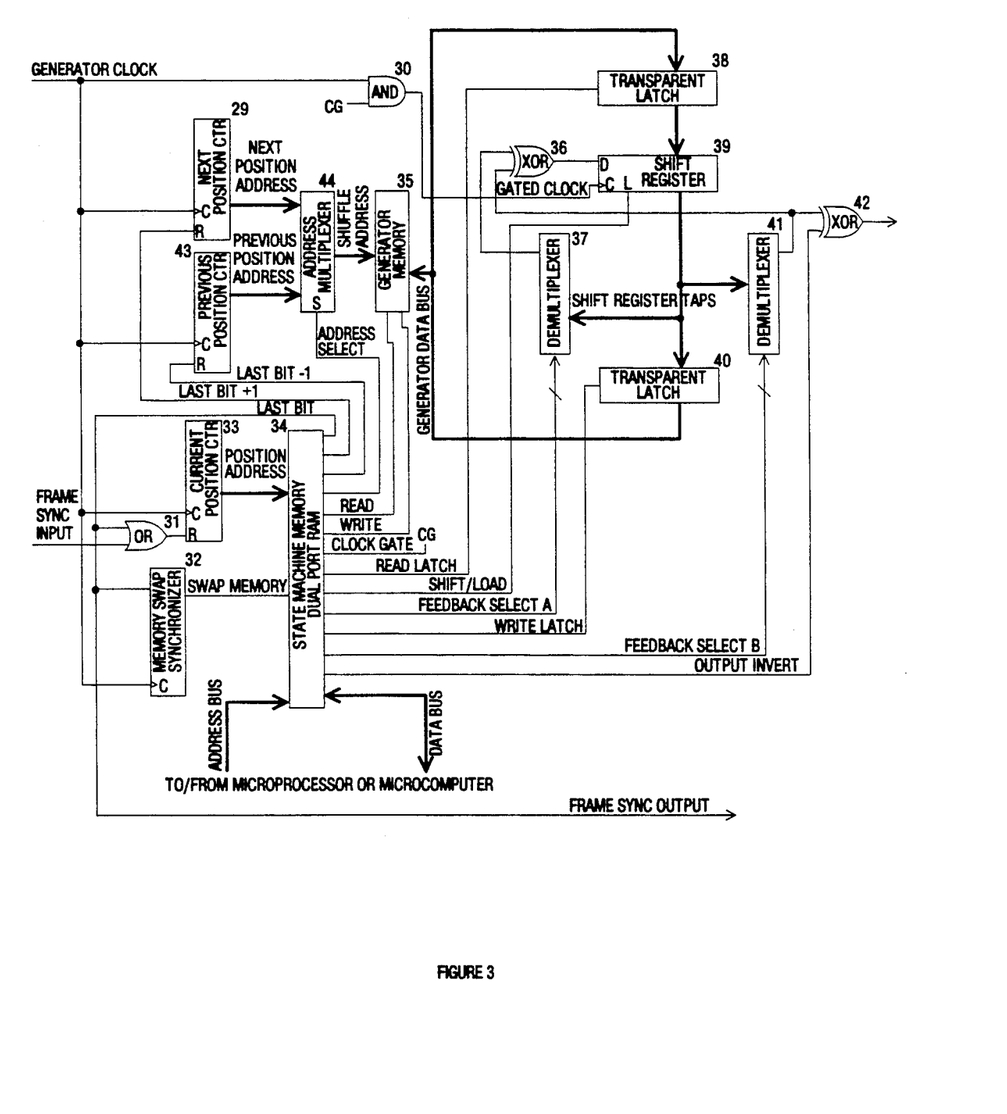
FIG. 3 presents a detailed block diagram of the test data generator circuitry of the present invention.

FIG. 3 presents a detailed block diagram for an implementation of state machine control 13 and test data generator 14 of the transmitter section of FIG. 2.

In FIG. 3, current position counter 33 creates a position address corresponding to each bit in the TDM structure. Current position counter 33 may be synchronized to a reference with the sync input which is ORed with the maxcount output from state machine memory 34 and then used to reset current position counter 33 at the reset (R) input. The maxcount signal is also provided as an output from the circuit since maxcount may be used as a synchronization pulse for structuring circuits which may follow.

State machine memory 34 is a means for generating state machine control signals. Suitable devices for generating state machine control signals are programmable read only memories (PROMs), read/write random access memories (RAMs), dual port RAMs, programmable array logic (PAL), programmable logic devices (PLDs), and gate arrays.

The position address connects to the address lines of dual port state machine memory 34 in order to access the control outputs stored within memory 34. Dual port memory 34 has two sets of address and data buses providing access for two devices simultaneously. Memory 34 is divided into two identical halves. One half is accessed by position address while the other half is accessed by a microprocessor. The contents of the most significant address bits are controlled by memory swap control register 32, providing a means to swap the half of memory 34 accessed by the microprocessor with the half accessed by position address. Register 32 synchronizes requests from the microprocessor with the maxcount signal from state machine memory 34 and the clock so that memory swaps occur hitlessly (i.e. without causing errors or gaps in test data being generated). Memory 34 data bus outputs corresponding to each position address provide signals for timing and control of the test data generation circuitry. The memory 34 data bus corresponding to the microprocessor address bus is used to load memory 34 with timing and control signal updates from the microprocessor. The ability to program memory 34 from a microprocessor, coupled with the hitless swapping of memory halves are what enables the generator to provide independent test data for multiple channels.

In the various applications of the present invention, the size of dual port memory 34 is determined by the number of control signals needed and the number of position address bits generated by current position counter 33. An alternative for creating memories of the size required is cascading multiple memory integrated circuits or chips in parallel to obtain the required number of address inputs and control signal outputs.

In an application where channels are continually moving within the structure based on positioning information within the structuring information, the positioning information may be monitored by the microprocessor and the microprocessor can then update state machine memory 34 such that generated data can be multiplexed into the channel position moving in the structure. The updating of state machine memory as previously described can also be applied to the receiver, allowing channels moving within the structure to be analyzed. Applications having channels which move within the structure include DSI systems and proprietary multiplexing schemes.

Previous position counter 43 and next position counter 29 are synchronized to current position counter 33 by control signals last bit−1 and last bit+1 respectively from state machine memory 34. Last bit−1 and last bit+1 connect to the reset (R) inputs of position counters 43 and 29 respectively. The outputs of position counters 43 and 29 are multiplexed together creating the shuffle address by multiplexer 44 and connect to generator memory 35 address lines by way of the shuffle address bus. The timing for the multiplexing is controlled by output signals from state machine memory 34.

Means for generating the shuffle address include the dual counter method mentioned above, and also includes operating adder and subtractor circuits off of the position address, and reading the shuffle address out of state machine memory 34.

Standard read/write random access memories (RAMs) for generator memory 35 work for the generation of pseudorandom patterns. In order to generate fixed patterns, programmable patterns, a sequence of bytes simulating a protocol, alternating patterns, and digitally encoded test tones, dual port memory must be used. A dual port memory would be configured as memory 34 and would also require swap control like memory swap control 32 circuitry. One address and data bus would connect as shown for memory 35, while the other would connect to the microprocessor. The operation of dual port memory 35 would be similar to that of memory 34 described previously.

Suitable means for storing contents of the means for producing generated test data, as well as means for storing contents of the means for producing reference data in FIG. 4, and means for storing contents of the means for synchronizing a data generator, and means for storing contents of the means for delaying recovered test data in FIG. 5 include RAMs, and dual port RAMs, registers, latches, and FIFOs.

Continuing the description of FIG. 3, the shuffle address first accesses the memory location for the previous position address for half of the time the channel address is present, and then switches to the next position address for the latter half of the channel address. The switching allows the contents of generator shift register 39 for the previous channel address to be stored and the previous contents of the shift register 39 for the next channel to be recalled while test data for the current channel is being generated in shift register 39.

Shift register 39 coupled with demultiplexers 37 and 41 and "exclusive or" (XOR) gate 36 comprise a pseudorandom pattern generator. The pattern generated depends on the taps (or stage outputs) selected for feedback from shift register 39 outputs to XOR 36 inputs. The number of stages in shift register 39 is determined by the length of pattern to be generated. Pattern lengths equal to $2^n - 1$ require n stages of shifting.

In order to generate test data for multiple channels, the contents of shift register 39 must be shuffled in and out of generator memory each time the channel address changes. The shuffling is accomplished by reading the next shift register 39 contents required from generator memory 35 and loading the contents into latch 38. The contents of shift register 39 for the previous channel address was transferred into latch 40 as soon as the current channel address became valid. The contents of latch 40 are transferred to generator memory during the current channel address as well. The cycle previously discussed continues indefinitely, with state machine memory controlling the transfer or shuffling of shift register contents, as well as the shift register taps selected for feedback by demultiplexers 37 and 42 for each channel address. The sequence previously discussed is implemented with the shuttle circuitry which consists of latch 38, shift register 39, latch 40 and receiver memory 35 coupled with state machine control signals from state machine memory 34.

The clock used to operate shift register 39 is gated with AND gate 30 by a control signal from state machine memory 34. The primary purpose for gating the clock is to prevent operation of the generation circuitry when the position address indicates the time framing bits would occur. By preventing operation of the generation circuitry, memory can not be corrupted when position addresses are not valid.

Another purpose for gating the clock is to allow generation of only a portion of the bits for a particular channel. Generation of a portion of the bits is useful in some testing applications, specifically for subrate testing.

The output of demultiplexer 41 is a generated test bit sequence. There are instances where test data of the opposite sense (i.e. inverted) is needed. XOR 42 is controlled by state machine memory 34 on a channel by channel basis to allow generated test bit sequences to be inverted. The output of XOR 42 is generated TDM test data.

Because of the number of applications in which the present techniques can be applied, the inventor believes a number of modifications may be possible such as: deleting next position counter 29 and latch 38, or deleting previous position counter 43 and latch 40.

FIG. 4 presents a block diagram of the test data receiver, detailing the state machine control 19, test data generator 21, delay 20 and compare 22 blocks of FIG. 2. In FIG. 4 recovered test data, receiver clock and frame sync signals are inputs to the test data receiver circuitry and have been described previously in the description for FIG. 2.

State machine control 19 and test data generator 21 blocks of FIG. 2 include clock AND gate 52, next position count 65, previous position counter 67, address multiplexer 66, current position counter 55, state machine memory 56, memory swap synchronizer 54, OR gate 53, generator memory 57, XOR gate 58, mux 59, latch 60, shift register 61, latch 64, demultiplexer 62 and demultiplexer 63. The circuitry previously listed works identically to the test data generator circuitry in FIG. 3, except for the modifications listed below.

The first modification is the sync input signal for OR gate 53. The sync input for OR gate 31 of FIG. 3 was optional, depending on how the transmitter test data was to be used. The receiver test data generator requires synchronization to TDM structuring information when analysis of individual channels is required. The only time the sync input signal may be omitted for the receiver test data generator is when there is no structuring on the incoming signal and test data fills the entire bandwidth (i.e. every bit) of the incoming signal.

The second modification is in the pseudorandom pattern generator created from XOR 58, mux 59, shift register 61, and demultiplexers 62 and 63. The pattern generator used in the test data generator of FIG. 3 did not have mux 59. Mux 59 is added to allow synchronization of the pattern generator to the recovered test data. When the pattern generator is not synchronized to the recovered test data for a particular channel, the select A (Sa) input of mux 59 is controlled by synchronization state machine block 23 of FIG. 2 to shift the test data received into shift register 61. When the synchronization state machine is checking for synchronization, or when the pattern generator is indeed in synchronization to the recovered test data, the Sa input of mux 59 is controlled to enable the feedback path connected from XOR 58 to shift register 61. When mux 59 is enabling the feedback path, the test data generator functions identically to the test data generator of FIG. 3. The synchronization state machine will be described more fully in the description of FIG. 5.

The third modification is the output invert control signal from state machine memory 56. Inverted output test data is not needed for the receiver circuitry, however the recovered test data must be inverted when the data in a channel is inverted. Therefore the output invert control signal from FIG. 3 has been changed to an input invert control signal connecting to XOR 45. The function of XOR 45 will be explained later in this description.

Receiver memory 46, latch 47, shift register 48 and latch 49 are configured to provide the delay function discussed in the description for FIG. 2, block 20. Recovered test data first passes through XOR 45 where the sense of the signal may be changed by the input invert control signal from state machine memory 56. The recovered test data must be inverted for any channels which contain inverted test data. If the sense of channels containing inverted test data is not corrected, synchronization to the recovered test data for those channels may not be possible, resulting in the inability to analyze those channels. Recovered test data is then clocked into shift register 48.

Shift register 48 is identical in length (i.e. number of stages) to shift register 61. Demultiplexers 50 and 63 select the same tap from each shift register 48 and 61 respectively, and send the data from these taps to the comparator which is XOR 51. (XOR 51 is compare block 22 of FIG. 2.)

Channels are shuffled in the delay circuitry just as they are in the pattern generator circuitry. Latch 47, shift register 48, latch 49 and receiver memory 46 coupled with state machine control signals from state machine memory 56 compose the shuttle circuitry and operate identical to the shuffle circuitry of FIG. 3.

XOR 51 performs a bit-by-bit comparison between the delayed recovered test data and the reference data generated by the receiver test data generator. When these two inputs to XOR 51 are not identical, an error pulse is generated.

FIG. 5 is a detailed block diagram for the synchronization state machine 23, sync loss threshold counters 24, status latch 25, and bit and error counter 26 blocks of FIG. 2. All of these functions are clocked by the gated clock signal generated by AND gate 52 shown in FIG. 4 and are controlled by signals from state machine memory 56 of FIG. 4. The shuffle address provided by multiplexer 66 and the error output provided by XOR 51, both of FIG. 4 are used by the test analyzer circuitry to control the processing of the recovered test data and to accumulate test results.

In FIG. 5 the synchronization state machine function is implemented using counter 73, state decoder memory 75, gates 68, 70, and inverter 71. The contents of counter 73 are shuffled in and out of synchronization analysis memory 72 through latches 74 and 69 respectively for each channel by control signals from state machine control memory 56 in FIG. 4. The contents of counter 73 is shuffled in and out as the channel address changes. Latch 69, counter 73, latch 74 and synchronization analysis memory 72 coupled with state machine control signals from state machine memory 56 of FIG. 4 compose the shuffle circuitry for the synchronization state machine and operate identical to the shuffle circuitry of FIG. 3, the only exception being that counter 73 of FIG. 5 corresponds to shift register 39 of FIG. 3.

The size of counter 73 depends on the test data to be generated. For pseudorandom and fixed patterns the counter needs to count 3 times the number of stages used in the longest pseudorandom pattern generation shift register plus one (i.e. shift registers 39 and 61 of FIGS. 3 and 4 respectively). An example is where the longest pattern to be generated is $2^{23}-1$ pseudorandom pattern, twenty-four shift register stages are required, and the counter must be able to count seventy-three times (three times twenty-four is seventy-two plus one is seventy-three). If the number of stages in the shift register is m (in the previous example, m was equal to 24), the first m counts of counter 73 for a particular channel are for loading recovered test data into pattern generator shift register 61 of FIG. 4. The run/load signal generated by state decoder memory 75 provides the loading and shifting control function. The next two times m counts are used to check for pattern synchronization of the reference data to the delayed recovered test data for a channel. If any errors occur during these counts, counter 73 is reset and the sequence begins again by loading shift register 61 for m counts. The verify sync signal from state decoder memory 75 enables the error pulse to propagate through AND gate 68 and on through NOR gate 70 to the reset (R) input of counter 73. Once the counter has counted m times and then two times m times more, the "in synchronization" or "insync" state is declared for that channel. State decoder memory 75 generates an in-sync signal after the m times and then two times m times count, which is latched by the status results latch discussed later and is also inverted by inverter 71 and then connected to the enable (E) input of counter 73 to disable counter 73. Synchronization is assumed until a sync loss is declared by the sync loss threshold counters discussed later.

State decoder memory 75 is shown as a pre-programmed read only memory (PROM). The same function may also be implemented using programmable array logic (PAL), PLDs, dual port RAMs, gate arrays and discrete AND, OR, NAND, NOR, XOR gates.

The status results latch corresponds to the status latch block 25 of FIG. 2 and consists of status results memory 82, latch 78, register 79, OR gates 80 and 81, register 83 and latch 102. Register 83, coupled with OR gates 80 and 81 store occurrences of sync-loss or in-sync conditions respectively, which have occurred over time for a particular channel. The first occurrences of these signals is gated through OR gate 80 and 81 directly from either sync lost AND gate 91 (discussed later) or state decoder memory 75 respectively and clocked through register 83. The occurrence of the sync-lost and in-sync signals is stored by feeding back the had sync-loss and had sync signals from the outputs of 83 through other inputs of OR gates 80 and 81 to the register 83 inputs. The occurrence of sync-lost and in-sync signals in previous TDM time periods for the same channel is recalled and stored by accessing the previous contents of register 83 for that channel from status results memory 82. The previous contents had been sent to status results memory 82 by latch 102. Latch 78 now passes the previous contents from status results memory 82 to register 79 where the contents are clocked to other inputs of OR gates 80 and 81, propagate through the gates to register 83 inputs. The final condition of the in-sync output signal of state decoder memory 75 is clocked into register 83 and saved for each channel within the TDM structure by passing through latch 102 to status results memory 82 with the had sync-loss and had-sync signals.

The shifting and storage of the status results through the status results latch circuitry is the shuffling described previously, but is implemented slightly differently, as was just described. The shifting and storage of the status results is controlled by state machine memory 56 shown in FIG. 4 and functions identically to the shuffle circuitry of FIG. 3, with the modifications just described.

Status results memory 82 is a dual port memory and operates as state machine memory 56 of FIG. 4. When the microprocessor issues a swap memory request to the swap memory synchronizer 54 of FIG. 4, the sense of the most significant address bit is toggled so that the memory portion that was accessed by the microprocessor is now accessed by latches 78 and 102 and the memory portion that was accessed by latches 78 and 102 is now being accessed by the microprocessor. The swapping of memory portions allows the microprocessor to access the results periodically. The microprocessor also typically resets the memory each time so that the had sync-loss and had sync conditions are cleared until they occur again. The inventor believes that in some applications of the present invention duplication of the memory swap synchronizer circuitry 54 of FIG. 4 may be useful so that status results memory 82 may be swapped independently of state machine memory 54 of r FIG. 4 or independently of other memories to which the swap memory (SM) signal may be connected.

The sync-loss threshold counters circuitry corresponds to sync-loss threshold counters block 24 of FIG. 2 and consist of sync loss analysis memory 84, latches 85 and 86, NOR gate 87, bit counter 88, error counter 89, inverter 90, AND gate 91 and latches 92 and 93. Bit counter 88 counts channel bits and error counter 89 counts channel errors which have occurred since the load cycle concluded in the synchronization state machine as indicated by the run/load signal from state decoder memory 75. The run/load signal passes through NOR gate 87 to signal bit counter 88 and error counter 89 reset input (R) to hold the counters reset while state decoder memory 75 is signaling a load condition. The size of bit counter 88 is larger than that of error counter 89 such that when less than q errors occur in p bits, where q is the maximum count of error counter 89 and p is the maximum count of bit counter 88, the terminal count (TC) of bit counter 88 will reset (R) both bit counter 88 and error counter 89 through NOR gate 87. If there is an instance when error counter 89 counts q errors before bit counter 88 counts p bits, a sync-lost condition is signalled by AND 91 as a result of bit counter 88 terminal count (TC) signal being inverted and gated with error counter 89 terminal count (TC) signal in AND gate 91. Error counter 89 runs only when signalled on the enable (E) input by the error pulse from XOR gate 51 on FIG. 4.

The proper size of the bit counter 88 and error counter 89 varies in different testing situations. The ratio between p and q conventionally remains in the range of 10 to 1 and 5 to 1. Ratios often used are 1000 to 100, 1000 to 256 and 100,000 to 20,000.

The contents of bit counter 88 and error counter 89 are shuffled in the sync-loss threshold counters circuitry just as the contents of pattern generator shift register 48 are shuffled in FIG. 3. Sync loss analysis memory 84, latches 85 and 86, bit counter 88, error counter 89, and latches 92 and 93 coupled with state machine control signals from state machine memory 56 of FIG. 4 compose the shuffle circuitry for the sync-loss threshold counters and operate identical to the shuffle circuitry of FIG. 3, the only modification being that bit counter 88 and error counter 89 of FIG. 5 corresponds to shift register 39 of FIG. 3.

In some applications of the present invention, allowing different sync loss thresholds for different channels may be necessary. This capability may be implemented by replacing sync loss analysis memory 84 with a dual port memory as described earlier and controlling the decoding of the count outputs of bit counter 88 and error counter 89 with additional bits from dual port sync loss analysis memory. These additional bits would connect to the programmable array logic inputs. The programmable array logic would have various threshold values pre-programmed for access by bit counter 88, error counter 89, and sync-loss analysis memory 84 outputs (through latches 85 and 86). Programmable array logic would then feed-back different signals for those now provided by bit counter 88 and error counter 89 terminal count (TC) signals. The dual port sync-loss analysis memory would be loaded with the appropriate sync loss threshold selection for each channel by the microprocessor.

The bit and error counters circuitry corresponds to bit and error counter block 26 of FIG. 2 and consists of bit and error results memory 94, latches 95 and 97, inverter 96, bit counter 98, error counter 99, and latches 100 and 101. The bit and error counters circuitry operates identically to the sync loss threshold counters previously described with the modifications discussed below.

The first modification is that bit counter 98 and error counter 99 are only reset for a particular channel when state decoder memory 75 indicates a load condition on the run/load signal. The sense of the run/load signal is changed by inverter 96 and then passed to the reset (R) inputs of bit counter 98 and error counter 99 to hold these counters in a reset condition.

The second modification is that there is no output signal per se. The output of the bit and error counters circuitry are counts of bits and counts of errors for each channel selected for analysis. These results are passed through the dual port bit and error results memory to the microprocessor. Operation of bit and error results memory 94 is identical to the operation of the status results memory 82 described earlier.

The size of the bit and error counters must be chosen based on the highest speed of any channel to be tested. An example of a higher speed channel is where three eight-bit channels are combined, the rate of the twenty-four bits must be used. The size is also based on the rate at which the microprocessor will read tne results from the bit and error results memory 94. The size of the counters is chosen such that the counters will not overflow more than once between microprocessor read cycles. The following formula may be used to calculate the minimum size of the counters:

Maximum Count needed = Highest Channel Rate
(Hz) × Microprocessor Cycle Time (seconds).

The inventor believes that in some applications of the present invention duplication of the memory swap synchronizer circuitry 54 of FIG. 4 may be useful so that the bit and error results memory 94 may be swapped independently of state machine memory 54 of FIG. 4 or independently of other memories to which the swap memory (SM) signal may be connected.

The inventor believes that other applications of the present invention include:

multiplexer/demultiplexer or channel bank testing whereby the present invention is connected for either generating or receiving the TDM data at the TDM bit rate, with the unused generating or receiving interface being demultiplexed into multiple channel-rate interfaces, allowing all of the channels within the TDM data to be analyzed;

network testing of multiple low speed channels whereby the present invention is fitted with a front end demultiplexing the generating and testing capabilities into multiple low speed test interfaces which could be connected at a test access point to perform multiple independent tests simultaneously.

What is claimed:

1. A method of producing generated time division multiplexed (TDM) test data independently for multiple channels simultaneously, comprising the steps of:

generating a time division multiplexed (TDM) bit rate clock;

generating a position address corresponding to each bit in said generated TDM test data, based on said clock;

generating control signals based on said position address;

generating a shuffle address based on said control signals to address contents of a test data generator, said contents being stored and recalled for said channels;

swapping said contents for a channel, as said position address for said channel changes to position address for next channel, with previous test data generator contents for said next channel based on said shuffle address and said control signals;

generating TDM test data by operating said test data generator based on said clock and said control signals while repeatedly shuffling contents for last channel out and contents for current channel into said test data generator;

whereby a continuous bit stream containing discrete and independent TDM channels of generated test data is produced.

2. The method of claim 1 wherein the step of generating a time division multiplexed (TDM) bit rate clock comprises the further step of deriving clock and synchronization information from a reference signal for synchronizing said position address.

3. The method of claim 1 comprising the further step of appending structuring bits to said generated TDM test data.

4. The method of claim 1 wherein the step of generating a position address comprises the step of dividing the position address into most significant bits (MSBs) and least significant bits (LSBs) portions where said MSBs provide a channel address corresponding to the fewest number of bits that are grouped consecutively which must be generated as a group and said LSBs provide state addresses for states which must occur during said channel addresses.

5. The method of claim 1 wherein the step of generating control signals comprises the further steps of:

programming state machine memory such that shifting between registers and generator memory occurs at correct times;

switching sense of most significant memory address bit for state machine memory so that the information loaded into said memory will be accessed by said position address and further updates may then be made to portion of said state machine memory accessible by opposite sense of said most significant memory address bit;

controlling timing of said switching by synchronizing requests for said switching with said position address and clock.

6. The method of claim 1 wherein the step of generating test data comprises the further steps of:

programming a state machine memory such that demultiplexers select correct shift register outputs for generated test patterns and for feedback for each position address;

programming generator memory with test data such that said test data is provided to the generator data bus for each position address;

switching sense of most significant memory address bit for said generator memory and said state machine memory so that information loaded into said memory will be accessed by said position address and further updates may then be made to portion of said generator memory and said state machine memory accessible by opposite sense of said most significant memory address bit;

controlling timing of said switching by synchronizing requests for said switching with said position address and clock.

7. The method of claim 2 wherein the step of connecting to media comprises the further step of multiplying derived or generated clock to generate additional position addresses in order to produce additional control signals.

8. The method of claim 3 wherein the step of appending structuring bits comprises the steps of:

accessing a structuring memory with position address;

controlling the multiplexing of said structuring bits into generated test data with said control signals.

9. The method of claim 5 wherein the step of programming state machine memory comprises the further steps of:

extracting any TDM positioning information present in media;

decoding said positioning information;

updating said state machine memory so that TDM data shifting in time may be generated within TDM structuring without interruption.

10. A method of testing time division multiplexed (TDM) test data independently for multiple channels simultaneously, comprising the steps of;

recovering a TDM bit rate clock and recovered test data from a TDM input signal;

recovering TDM structuring information contained within said recovered test data for synchronization of a position address to said TDM structuring;

generating said position address corresponding to each bit in said recovered test data, based on said clock;

generating control signals based on said position address;

generating a shuffle address based on said control signals to address contents of a reference generator and a results accumulator, said contents being stored and recalled for said channels;

swapping said contents for a channel, as said position address for said channel changes to position address for next channel, with previous reference generator and results for said next channel based on said shuffle address and said control signals;

generating TDM reference data by operating said reference generator based on said clock and said control signals while repeatedly shuffling contents for last channel out and contents for current channel into said reference generator;

analyzing said recovered test data based on said contents of said reference generator for a channel in order to derive results;

accumulating said results by operating said results accumulator based on said clock and said control signals while repeatedly shuffling contents for last channel out of said accumulator and contents for current channel into said accumulator;

whereby TDM channels within the recovered test data are simultaneously analyzed independently.

11. The method of claim 10 wherein the step of recovering a TDM bit rate clock comprises the further step of multiplying said clock to generate additional position addresses in order to produce additional control signals.

12. The method of claim 10 wherein the step of generating a position address comprises the step of dividing the position address into most significant bits (MSBs) and least significant bits (LSBs) portions where said MSBs provide a channel address corresponding to the fewest number of bits that are grouped consecutively which must be generated as a group and said LSBs provide state addresses for states which must occur during said channel addresses.

13. The method of claim 10 wherein the step of generating control signals comprises the further steps of:
programming state machine memory such that shifting between registers and generator memory occurs at correct times;
switching sense of most significant memory address bit for state machine memory so that the information loaded into said memory will be accessed by said position address and further updates may then be made to portion of said state machine memory accessible by opposite sense of said most significant memory address bit;
controlling timing of said switching by synchronizing requests for said switching said position address and clock.

14. The method of claim 10 wherein the step of analyzing said recovered test data comprises the further steps of:
synchronizing a data generator to said recovered test data for multiple time periods;
generating test data for multiple time periods;
delaying said recovered test data for multiple TDM time periods in order to bit align said recovered test data with the data output by said data generator;
comparing delayed recovered test data with said data generator data for the purpose of analyzing said recovered test data.

15. The method of claim 10 wherein the step of accumulating said results comprises the step of accumulating results of BIT COUNT, BIT ERRORS, BLOCK ERRORS, FREQUENCY, DELAY, ENCODED LEVEL, NOISE, SYNCHRONIZATION, SYNCHRONIZATION LOSS, and SYNCHRONIZATION LOST for each TDM channel.

16. The method of claim 13 wherein the step of programming state machine memory comprises the further steps of:
extracting any TDM positioning information present in media;
decoding said positioning information;
updating said state machine memory so that TDM data shifting in time may be generated within TDM structuring without interruption.

17. The method of claim 14 wherein the step of synchronizing a data generator comprises the further step of swapping contents of synchronization state machine for a channel, as said position address for said channel changes to position address for next channel, with previous synchronization state machine contents for said next channel based on said shuffle address and said control signals;

18. The method of claim 14 wherein the step of generating test data comprises the further steps of:
programming a state machine memory such that demultiplexers select correct shift register outputs for generated test patterns and for feedback for each position address;
programming generator memory with test data such that said test data is provided to the generator data bus for each position address;
switching sense of most significant memory address bit for said generator memory and said state machine memory so that information loaded into said memory will be accessed by said position address and further updates may then be made to portion of said generator memory and said state machine memory accessible by opposite sense of said most significant memory address bit;
controlling timing of said switching by synchronizing requests for said switching with said position address and clock.

19. The method of claim 14 wherein the step of analyzing said recovered test data comprises the further step of delaying said recovered test data by swapping contents of a delay register for a channel, as said position address for said channel changes to position address for next channel, with previous delay register contents for said next channel based on said shuffle address and said control signals.

20. A system for producing generated time division multiplexed (TDM) test data independently for multiple channels simultaneously having:
1) means for producing generated test data which, when controlled by a means for generating state machine control signals, produces said generated TDM test data as an output;
2) means for generating a position address corresponding to each bit in said generated TDM test data;
3) means for storing contents of said means for producing generated test data for each of said channels and later recalling said contents, connected to said means for producing generated test data;
4) means for generating a shuffle address based on said position address, connected to said means for storing for addressing said means for storing;
5) means for generating state machine control signals addressed by said position address for: controlling said means for generating a shuffle address, controlling said means for generating a position address and controlling transferring of contents of said means for producing generated test data between said means for storing and said means for producing generated test data, said means for generating state machine control connected to said means for generating a position address, said means for generating a shuffle address, said means for storing and said means for producing generated test data;
6) means for generating a TDM bit rate clock connected to said means for generating a position address, said means for producing generated test data and said shuffle address generating means.

21. The system of claim 20 wherein said means for generating a TDM bit rate clock comprises means for deriving clock and synchronization information by connecting to media and to said means for generating a position address for synchronizing said position address.

22. The system of claim 20 having further means for appending structuring bits to said generated TDM test data, said means for appending connecting to said means for generating a TDM bit rate clock, said means for generating a position address, and said means for producing generated test data.

23. The system of claim 20 wherein the means for generating state machine control signals includes:
1) means for programming state machine memory connected to said state machine memory such that shifting between registers and generator memory occurs at correct times;
2) means for switching sense of most significant memory address bit for state machine memory connected to said memory, said means for generating a position address and said means for generating a TDM bit rate clock such that the information loaded into said memory will be accessed by said position address and further updates may then be made to portion of said state machine memory accessible by opposite sense of said most significant memory address bit.

24. The system of claim 20 wherein the means for producing generated test data include:
1) means for programming state machine memory connected to state machine memory, such that demultiplexers select correct shift register outputs for generated test patterns and for feedback for each position address;
2) means for programming generator memory with test data connected to generator memory, such that said test data is provided to the generator for each position address;
3) means for switching sense of most significant memory address bit for said generator memory and said state machine memory connected to said memories so that the information loaded into said memories will be accessed by said shuffle address and said position address, allowing further updates to then be made to portion of said generator memory and said state machine memory accessible by opposite sense of said most significant memory address bit;
4) means for controlling timing of said switching by synchronizing requests for said switching with said position address and clock connected to said position counter and said clock.

25. The system of claim 21 wherein the means for deriving clock and synchronization information comprises the means for multiplying derived or generated clock to generate additional position addresses in order to produce additional control signals, said means for multiplying connecting to said means for generating a position address and said means for recovering a TDM bit rate clock.

26. The system of claim 22 wherein the means for appending structuring bits includes:
1) accessing a structuring memory with position address;
2) controlling the multiplexing of said structuring bits into generated test data with said control signals.

27. The system of claim 23 wherein the means for programming state machine memory includes:
1) means for extracting any TDM positioning information which may already be present in media, said means for extracting connected to said media;
2) means for decoding said positioning information connected to said means for extracting and to a means for updating said state machine memory;
3) means for updating said state machine memory so that TDM data shifting in time may be generated within TDM structuring without interruption, said means for updating connecting to said state machine memory.

28. A system for synchronizing to and testing time division multiplexed (TDM) test data independently for multiple channels simultaneously having:
1) means for recovering a TDM bit rate clock and recovered test data from a TDM input signal to be tested;
2) means for recovering TDM structuring information from said recovered test data for synchronizing a position address to said recovered test data, connected to said means for recovering clock and data;
3) means for generating a position address synchronized to said TDM structuring information which corresponds to each bit in said recovered test data, connected to said means for recovering clock and data, and said means for recovering TDM structuring;
4) means for generating state machine control signals addressed by said position address for: controlling said means for generating a position address, controlling a means for generating a shuffle address, controlling transfer of contents of a means for producing reference data between a means for storing said contents of said means for producing reference data and said means for producing reference data, controlling transfer of contents of a means for accumulating results between a means for storing said contents of a means for accumulating results and said means for accumulating results, said means for generating state machine control connected to said means for generating a position address, said means for generating a shuffle address, said means for storing said contents of said means for producing reference data, said means for storing said contents of said means for accumulating results, said means for accumulating results, and, said means for producing reference data;
5) means for producing said reference data which, when controlled by said means for generating state machine control signals, produces said reference data, connected to said means for recovering clock and data;
6) means for analyzing said recovered test data by comparison to said reference data, said results from said analyzing being sent to said means for accumulating results, said means for analyzing being connected to said means for recovering clock and data, said means for producing reference data, and said means for accumulating results;
7) means for accumulating said results connected to said means for recovering clock and data;
8) means for storing contents of said means for producing reference data for each of said channels and later recalling said contents, connected to said means for producing reference data;
9) means for storing contents of said means for accumulating results for each of said channels and later recalling said contents, connected to said means for accumulating results;
10) means for generating a shuffle address based on said position address, connected to said means for recovering clock and data, said means for storing contents of said means for producing reference data and said means for storing contents of said means for accumulating results for addressing said means for storing contents of said means for producing reference data and said means for storing contents of said means for accumulating results.

29. The system of claim 28 wherein the means for recovering a TDM bit rate clock comprises the means for multiplying derived or generated clock to generate additional position addresses in order to produce additional control signals, said means for multiplying connecting to said means for generating a position address and said means for recovering a TDM bit rate clock.

30. The system of claim 28 wherein the means for generating state machine control signals includes:
   1) means for programming state machine memory connected to said state machine memory such that shifting between registers and generator memory occurs at correct times;
   2) means for switching sense of most significant memory address bit for state machine memory connected to said memory, said means for generating a position address and said means for generating a TDM bit rate clock such that the information loaded into said memory will be accessed by said position address and further updates may then be made to portion of said state machine memory accessible by opposite sense of said most significant memory address bit.

31. The system of claim 28 wherein the means for analyzing said recovered test data includes:
   1) means for synchronizing a data generator to said recovered test data for multiple time periods, said means for synchronizing connected to data generator;
   2) means for producing generated test data connected to said means for generating state machine control signals;
   3) means for delaying said recovered test data for multiple TDM time periods in order to bit align said recovered test data with said reference data, said means for delaying connected between said means for recovering TDM clock and data, and said means for analyzing;
   4) means for comparing delayed recovered test data with said reference data for the purpose of analyzing said recovered test data, said means for comparing connected to said means for delaying and said data generator.

32. The system of claim 28 wherein the means for accumulating the results comprises the means for accumulating results of BIT COUNT, BIT ERRORS, BLOCK ERRORS, FREQUENCY, DELAY, ENCODED LEVEL, NOISE, SYNCHRONIZATION, SYNCHRONIZATION LOSS, and SYNCHRONIZATION LOST for each TDM channel, connected to said means for recovering clock and data, and said means for analyzing.

33. The system of claim 30 wherein the means for programming state machine memory includes:
   1) means for extracting any TDM positioning information which may already be present in media, said means for extracting connected to said media;
   2) means for decoding said positioning information connected to said means for extracting and to a means for updating said state machine memory;
   3) means for updating said state machine memory so that TDM data shifting in time may be generated within TDM structuring without interruption, said means for updating connecting to said state machine memory.

34. The system of claim 31 wherein the means for synchronizing a data generator includes further means for storing contents of said means for synchronizing for each of said channels and later recalling said contents of said means for synchronizing, said means for storing contents being connected to said means for accumulating results.

35. The system of claim 31 wherein the means for producing generated test data include:
   1) means for programming state machine memory connected to state machine memory, such that demultiplexers select correct shift register outputs for generated test patterns and for feedback for each position address;
   2) means for programming generator memory with test data connected to generator memory, such that said test data is provided to the generator for each position address;
   3) means for switching sense of most significant memory address bit for said generator memory and said state machine memory connected to said memories so that the information loaded into said memories will be accessed by said shuffle address and said position address, allowing further updates to then be made to portion of said generator memory and said state machine memory accessible by opposite sense of said most significant memory address bit;
   4) means for controlling timing of said switching by synchronizing requests for said switching with said position address and clock connected to said position counter and said clock.

36. The system of claim 31 wherein the means for delaying said recovered test data includes further means for storing contents of said means for delaying for each of said channels and later recalling said contents of said means for delaying, said means for storing contents being connected to said means for analyzing, and said means for receiving clock and data.

* * * * *